(12) United States Patent
Sharp et al.

(10) Patent No.: US 8,280,753 B1
(45) Date of Patent: *Oct. 2, 2012

(54) SYSTEMS AND METHODS FOR BRIDGING COVERAGE

(75) Inventors: Adam Grant Sharp, Helotes, TX (US); Michael Roger Baublit, San Antonio, TX (US)

(73) Assignee: USAA, San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/157,212

(22) Filed: Jun. 9, 2011

Related U.S. Application Data

(63) Continuation of application No. 11/321,403, filed on Dec. 29, 2005, now Pat. No. 7,974,858.

(51) Int. Cl.
*G06Q 40/00* (2006.01)
(52) U.S. Cl. .............................. 705/4; 705/35
(58) Field of Classification Search ................. 705/4, 35
See application file for complete search history.

(56) References Cited

U.S. PATENT DOCUMENTS

| 7,765,115 B1 * | 7/2010 | Davies et al. ................ 705/4 |
| 7,974,858 B1 | 7/2011 | Sharp et al. | |
| 2002/0111835 A1 * | 8/2002 | Hele et al. ................ 705/4 |
| 2003/0187768 A1 * | 10/2003 | Ryan et al. ................ 705/35 |

OTHER PUBLICATIONS

*Keirsey v. Banner Life Insurance Co, et al.*, No. 03-6013 (10th Cir., W.O. Okla. Aug. 16, 2004).*
"Serving Those Who Serve", Greg MacSweeney, Insurance & Technology, Jul. 2003, vol. 28:7, p. 23, 4 pages.
"Mix and Match", Barbara Bowers, Best's Review, Apr. 2002, vol. 102:12, pp. 30-38, 9 pages.
*Keirsey v. Banner Life Insurance Co., et al.*, Case No. 03-6013, Order and Judgment (10th Cir., W.D. Oklahoma, Aug. 16, 2004), 5 pages.
American Life, (Accessed: Dec. 12, 2005), <http://www.americanlifeny.com>, 2 pages.
RBC Insurance, (Accessed: Dec. 12, 2005), <https://www.rbcexpressterm.com/default.asp?p=>, 2 pages.
Guarantee Trust Life (GTL), (Accessed: Dec. 12, 2005), <http://www.gtllifeinsurance.com/launch.aspx?roi=google_ht_textad>, 2 pages.
Jefferson National, (Accessed: Dec. 12, 2005), <https://secure.jefnat.com/quotal/quotewidget.cfm?agentid=4516928&promotioncode=51378B>, 2 pages.
Speedy Life, (Accessed: Dec. 12, 2005), <http://www.speedylife.com/?a=140&c=1054>, 1 page.

(Continued)

*Primary Examiner* — Luke Gilligan
*Assistant Examiner* — Joseph Burgess
(74) *Attorney, Agent, or Firm* — Kilpatrick Townsend & Stockton LLP

(57) ABSTRACT

A method of providing a bridge life insurance policy includes receiving a request for a life insurance policy having a coverage amount, wherein approval of the request requires completion of an external process, and determining that the customer is a pre-existing customer of an organization associated with the life insurance policy. The method also includes determining, using a processor, that the customer meets eligibility requirements for a bridge life insurance policy and obtaining financial information associated with the customer from the organization associated with the life insurance policy. The method further includes defining a coverage amount for the bridge life insurance policy less than or equal to the coverage amount of the life insurance policy and issuing the bridge life insurance policy to the customer. Additionally, the method includes initiating the external process, issuing the life insurance policy, and terminating the bridge life insurance policy.

20 Claims, 7 Drawing Sheets

OTHER PUBLICATIONS

Term Life Florida, (Accessed: Dec. 12, 2005), <http://www.termlifeflorida.com/instant-term-insurance.html>, 3 pages.
Cheval Bridging Finance, (Accessed: Apr. 25, 2006), <http://www.cheval.co.uk>, 1 page.
Professional Financial Services, copyright 2005, (Accessed: Apr. 25, 2006), <http://www.pfsdirect.co.uk>, 2 pages.
Temporary Insurance Plan.com, (Accessed: Apr. 25, 2006), <http://www.temporaryinsuranceplan.com>, 2 pages.
Prudential California Reality, (Accessed: Apr. 25, 2006), <http://www.prorealty.com/FGArtBridoeLoans.aspx>, 1 page.
Lloyds TSB, (Accessed: Apr. 25, 2006), <http://www.lloydstsb.com/loans/bridging_loan.asp>, 1 page.

* cited by examiner

SYSTEMS AND METHODS FOR BRIDGING COVERAGE

CROSS REFERENCES TO RELATED APPLICATIONS

This application is a continuation of U.S. patent application Ser. No. 11/321,403, filed on Dec. 29, 2005, and entitled "SYSTEMS AND METHODS FOR BRIDGING COVERAGE," the disclosure of which is hereby incorporated by reference in it entirety.

TECHNICAL FIELD

This application relates to systems and methods for account processing of a service customer and more particularly to systems and methods of providing bridging insurance coverage for a customer.

BACKGROUND OF THE INVENTION

Life insurance is one component of financial stability. Life insurance provides stability for those that are left behind. Planning ahead and securing life insurance ensures that they are taken care of. This is just one aspect of the many financial services that a person needs for financial stability.

Life insurance provides a financial benefit to a beneficiary if the insured dies. This benefit is one way the insured can be certain that the beneficiary is financially stable even when they are gone. The life insurance policy is a contract between the insurance company issuing the policy and the insured. In return for the payment of regular premiums to the insurance company, the beneficiary of the policy gets a payment when the insured dies. The insurance company is motivated by financial concerns to reach a balance between the amount of money brought in with premiums across all life insurance policies and the money paid out to beneficiaries. The insurance company collects information when a new customer requests a life insurance policy. This information enables the insurance company to properly set the premium payment by assessing the risk of the customer. If, for instance, the potential customer is employed in a high-risk occupation such as race-car driver, the risk to the insurance company insuring them is higher, so, the premium payments will be higher. However, a higher premium payment may mean that the customer does not accept the policy and the company loses that potential business. The company needs to make this balance between lower premiums that attract more new customers, but potentially higher risk and higher premiums that lower the financial risk to the company, but fewer customers.

In addition to life insurance, there are many other aspects of financial stability, such as banking accounts, mortgages, retirement accounts, and brokerage accounts.

SUMMARY OF THE INVENTION

In an embodiment, an apparatus to provide bridging coverage comprises a receiver module to receive a request for a financial service from a requestor and an underwriter module to underwrite a bridging financial service. In an embodiment, a method to provide a bridging coverage to a customer includes receiving from a requestor a request for a financial service, underwriting a bridge financial service at the time of the request, and initiating the external processes required for the approval of a final insurance policy. In a further embodiment, the method additionally includes completing the external processes, underwriting a final financial service based on the external processes and terminating the bridge financial service.

BRIEF DESCRIPTION OF THE DRAWINGS

Embodiments are illustrated by way of example and not limitation in the figures of the accompanying drawings, in which like references indicate similar elements and in which.

In the following detailed description of example embodiments, reference is made to the accompanying drawings, which form a part hereof, and in which is shown, by way of illustration, specific embodiments in which the example method, apparatus, and system may be practiced. It is to be understood that other embodiments may be utilized and structural changes may be made without departing from the scope of this description.

Figure 1:
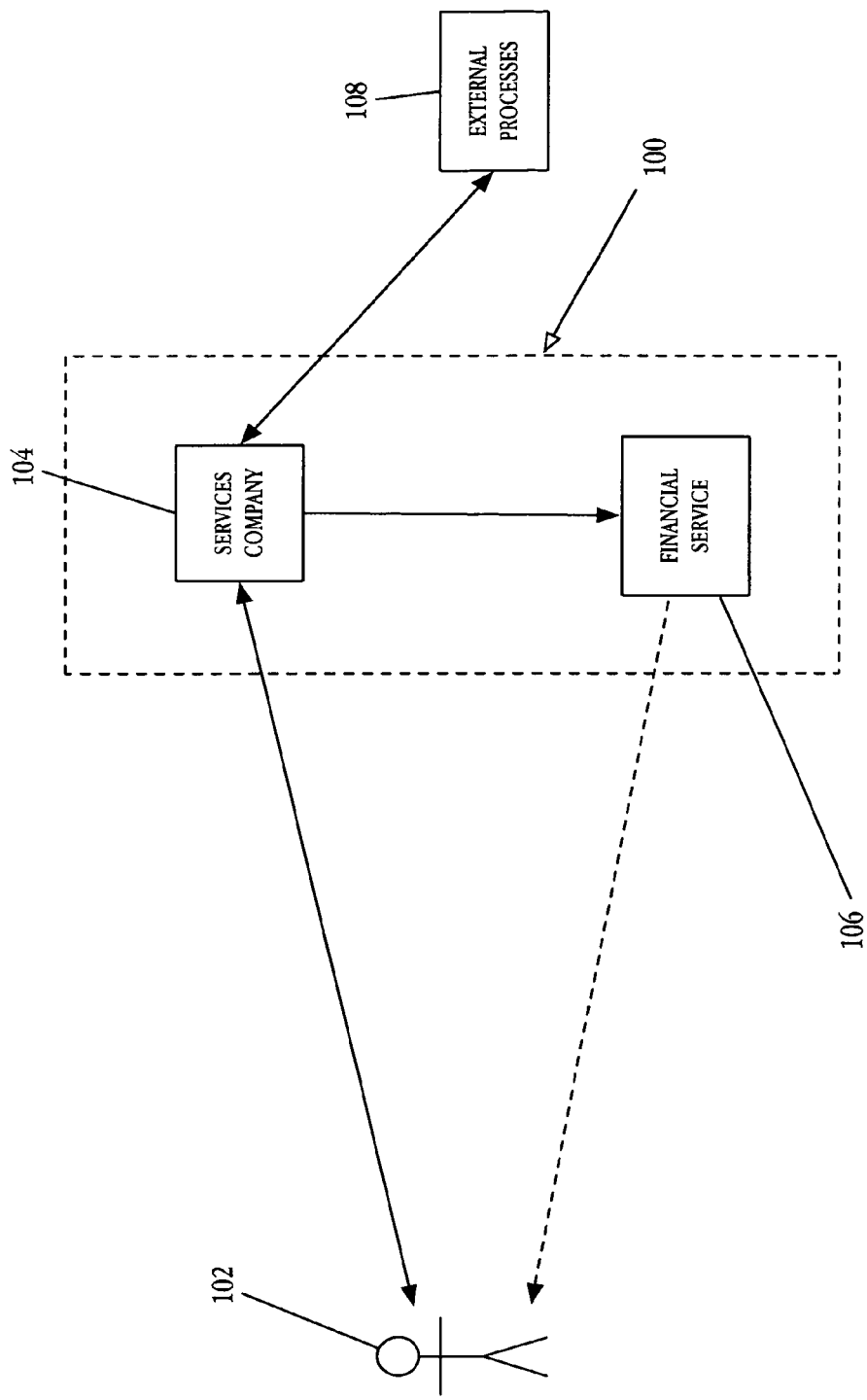
FIG. 1 is a high level block diagram of a system for processing of a customer for financial services, in accordance with an example embodiment.

FIG. 1 is a high level block diagram of a system 100 for the processing of a customer for financial services, in accordance with an example embodiment. Financial services include, without limitation: life insurance, secured loans, mortgages, brokerage accounts, or any account where the customer is required to provide information and receive approval before the financial services are provided. In one embodiment, the system 100 comprises a services company 104 providing a financial service 106. The service company provides the financial service to a requestor 102, in one example. The requestor 102 includes any individual requiring some financial service 106 from the services company 104. The services company 104 may include, without limitation, an insurance company, a banking institution, a lending institution, a brokerage service, and the like. In one embodiment, the financial service 106 is a life insurance policy underwritten by an insurance company which pays a pre-set benefit to a beneficiary provided one or more premium payments are paid to the insurance company.

In an embodiment, the services company 104 requires information prior to the issuance or setting up of the financial service 106. The services company 104 acquires this information at least in part through one or more external processes 108. However, the one or more external processes 108 create a delay between when the requestor 102 requests the financial service 106 and when the services company 104 issues or sets it up. These external processes 108 may include without limitation, background investigation, medical examination, blood or urine analysis, title check, credit check, and the like.

Using life insurance as the financial service, an illustrative example regarding FIG. 1 can be described. The insurance company agrees to provide a life insurance policy to the requestor 102, so long as premiums are paid in a timely manner. The premiums are the requestor's portion of the contract as discussed above. Premiums are set by the insurance company based on the particular situation of the requestor 102 and represent the insurance company's revenue from the life insurance policy. By properly setting premiums across all insured persons, the insurance company is able return a profit. If the premiums are set too low, the insurance company could lose money as the policies are paid out. If the premiums are set too high, the insurance company could lose a potential customer to another company willing to underwrite the policy for a lower premium. In another context, the premium is the company's mechanism to manage risk over the aggregate of all insured parties.

In the context of a life insurance policy, the particulars include, without limitation, age, occupation, medical condition, and amount of coverage. Based on this information, the insurance company sets a premium for the policy. Unfortunately, the acquisition and verification of this information takes time. For example, a determination of medical soundness may require a blood or urine sample, or physical examination. Additionally, the requestor 102 may need to complete one or more forms. Alternatively, for other financial services, additional information may be required, such as, title searches for loans secured by a property, a credit rating for an unsecured loan, or a credit check. Mention of specific examples are intended to be illustrative only and are not meant to be limiting in any manner. Any information that a company may require in order to provide a financial service to a customer is considered to be within the scope of the present discussion.

The delay between requesting insurance and the issuance of the final insurance policy creates a situation where the requestor 102 is not covered by insurance despite their desire to be covered by some insurance policy. The requestor 102 has no protection during this period. Additionally, during this period the insurance company can lose the opportunity to sell the policy because of the delay. Furthermore, the requestor 102 may forget, lose the paperwork, become disinterested, or contact another insurance company.

In one embodiment, the services company 104 provides the financial service 106 requested in a temporary manner to the requestor 102 while the one or more external processes 108 are completed. This temporary service provides the requestor 102 with the guarantee or piece of mind they do not have while waiting for completion of various external processes 108. In one embodiment, the temporary coverage is called a bridging service. In an alternate embodiment, the temporary coverage is called an Instant Bind Service, such as an Instant Bind Life Insurance Policy of United Serviceman's Automobile Association. But, this temporary service creates an additional risk to the services company 104, a risk that can be minimized using a variety of apparatus and systems as described herein. Discussion regarding increasing the piece of mind of the requestor 102 during the delay while one or more external processes are completed is discussed below.

Figure 2:
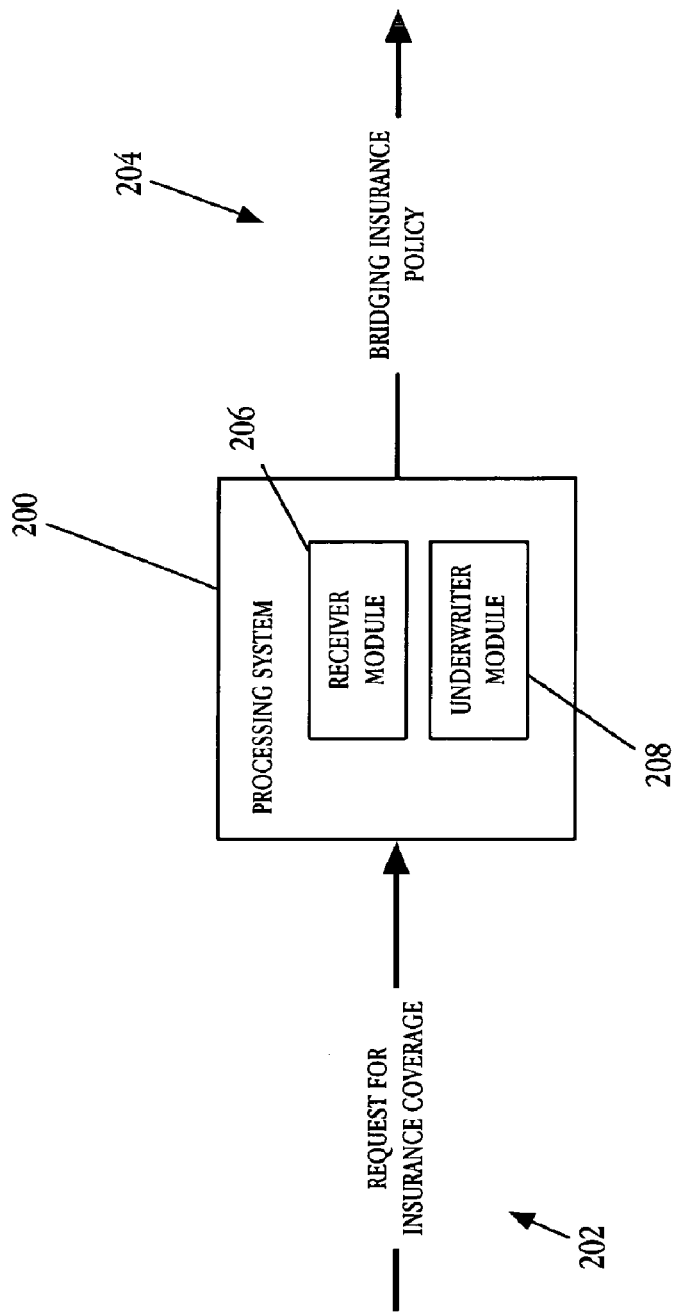
FIG. 2 is a high level block diagram of customer processing, in accordance with an example embodiment.

FIG. 2 is a high level block diagram of customer processing, in accordance with an example embodiment. In an embodiment, a processing system 200 receives a request for insurance coverage 202 as an input and generates a bridging insurance policy 204. The processing system 200 includes a receiver module 206 and an underwriter module 208, in an embodiment.

In an embodiment, the receiver module 206 is configured to receive a request 202 for insurance coverage from a requestor 102. In an embodiment, the request 202 may be received over a Public Switched Telephone Network (PSTN). In an alternate embodiment, a form is manually completed and sent via mail to the insurance company. In either of these two cases, an agent at the insurance company may, in one example, enter this information into a computerized system, such that the receiver module 206 receives the required information directly from the agent and indirectly from the requestor 102. In another example, the request 202 may be received over a computer network through any suitable means, such as a web-enabled form. The request 202 may contain just a simple query whereby the requestor 102 shows interest in the possibility of obtaining an insurance policy, or may contain all the information required from the requestor 102 to have their application begin to be processed for the issuance of an insurance policy. In the example where the simple query was sent, the receiving module may further query the requestor 102 for more information sufficient to complete the application.

In an embodiment, the underwriter module 208 is configured to immediately issue a bridging insurance policy 204. As discussed above, the time delay from initial request for an insurance policy to final issuance creates a period where the requestor 102 is uncovered. A bridging insurance policy 204 as used here is meant to denote any policy written immediately upon request for insurance. The bridging insurance policy 204 may not be a final insurance policy as discussed above with respect to FIG. 1. The bridging insurance policy 204, in the context of the present discussion, is a time limited insurance policy that may cover the requestor 102 during the time it will take to complete the one or more external processes 108 that the company needs to complete to make a final determination regarding a final insurance policy. In an embodiment, the bridging insurance policy 204 may also be limited as to the benefits it provides the requestor 102 in addition to the term length.

The bridging insurance policy 204 may terminate when the final policy is issued or it can be converted into the final policy when such policy is approved. It may or may not provide double coverage if it overlaps the final policy. The bridging insurance policy 204 may differ from the final policy in that it is underwritten when the initial request is processed. The bridging insurance policy provides coverage to the requestor 102 in the event of their death. Should the requestor 102 die while covered by the bridging insurance policy 204, the coverage amount may be paid out to their beneficiary. Additionally, the bridging insurance policy 204 may have an expiration date associated with it. For instance, the insurance company may decide that 90 days is a normal period of time to complete all the needed information. In that example, the bridging insurance policy 204 could be set to expire after 90 days. This ensures that the risk of writing the bridging insurance policy 204 is lessened and provides an incentive to the requestor 102 to assist in the timely submission of the needed information needed.

In one embodiment, the underwriter module 208 is operatively coupled to the receiver module 206 such that information received in the request 202 or in response to further queries is passed to the underwriting module 208. In another embodiment, the underwriter module 208 is configured to determine if the requestor 102 is eligible for a bridging insurance policy 204 and only issues the bridging insurance policy 204 if they are eligible.

Figure 3:
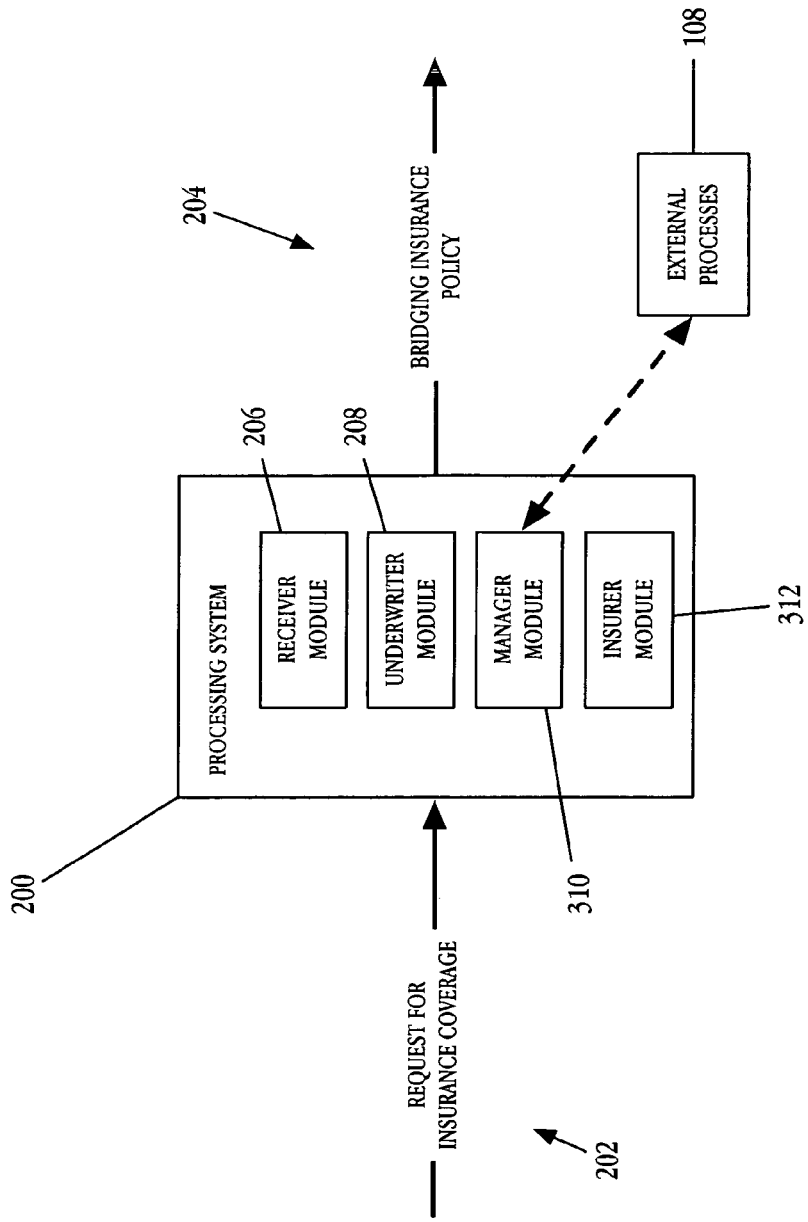
FIG. 3 is a more detailed architecture of a system for customer processing, in accordance with an example embodiment.

FIG. 3 shows a more detailed architecture of an apparatus for customer processing, in accordance with an example embodiment. The apparatus depicted in FIG. 3 is similar to that depicted in FIG. 2 with the addition of a manager module 310 and an insurer module 312.

In an embodiment, the manager module 310 is configured to manage external processes 108 required to complete the final approval of a policy or service. As discussed above, in order to issue a final insurance policy, several processes external to the insurance company are performed prior to the issue. In the context of the present discussion, external processes 108 may be any steps that are not performed directly by the insurance company, such as a medical examination, form completion and the like. In the context of other financial services, such external processes 108 may include, without limitation, a credit report, property appraisal, background investigation, or title check. Each of these requires an initial request by the company and a subsequent reply to the request. The reply contains the information requested. The manager module 310 is configured to send a request and to receive a reply to that request. In one embodiment, the requests may be sent electronically over any suitable network and the reply is received in a like manner. In another embodiment, an agent is prompted by the manager module 310 to request the information needed. Additionally, in that example, the agent is further prompted to enter that information into the manager module 310 when the reply is received. In such an example, the prompting may be made by any suitable means such as e-mail, automated telephone message, or an electronic task in a task manager software application.

In one embodiment, the receiver module 206, the underwriter module 208, the manager module 310, and the insurer module 312 are operably coupled and provide a comprehensive system by which a requestor 102 can request a financial service, receive an instant bridging service, and be approved for the financial service after the external processes 108 are complete. In the context of a life insurance policy and using the apparatus described here with respect to FIG. 2, such a system may be configured in the following manner. The receiver module 206 is configured to receive a request for a life insurance policy. The request contains information sufficient for the underwriter module 208 to determine if the requestor 102 is eligible for a bridging insurance policy 204. The underwriter module 208 is configured to issue a bridging insurance policy 204 for some amount. In addition to providing the information in the request to the underwriter module 208, the receiver module 206 is configured to send that information to the manager module 310. The manager module 310 is configured to initiate the external processes 108 required by the insurer module 312. The insurer module 312 is configured to receive the information obtained by the external processes 108 and the initial request and make a determination to issue a final insurance policy. Following issuance of the final insurance policy, the bridging insurance policy 204 can be terminated, or in some examples, converted into the final insurance policy. If the insurer module 312 determines not to issue a final insurance policy or if the external processes 108 are unable to be completed within some specified time period, the bridging insurance policy 204 is terminated.

Figure 4:
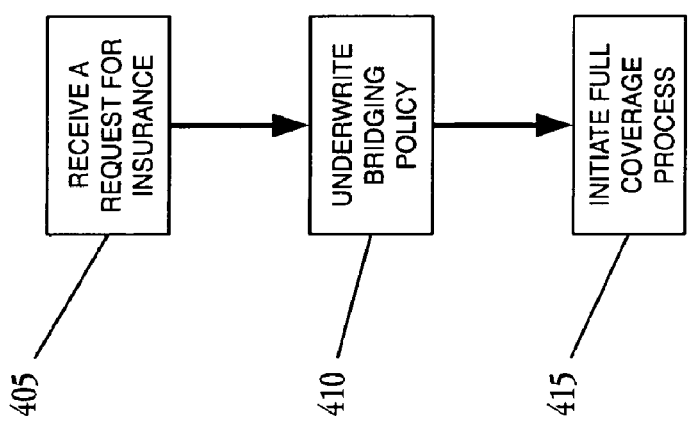
FIG. 4 shows a flow diagram of a method of customer processing; in accordance with an example embodiment.

FIG. 4 shows a flow diagram of a method of customer processing, in accordance with an example embodiment. The method depicted in FIG. 4 may be carried out in the system discussed above with respect to FIG. 1, in one example.

At block 405, a request for an insurance policy is received from a potential customer. At block 410, a bridging insurance policy is issued. In one embodiment, the bridging insurance policy is issued at the time the full request is received. In one example, the request contains information sufficient to issue the bridging insurance policy. In another example, the request does not contain sufficient information. In such a situation, the potential customer can be queried for further information. In both examples, the bridging insurance policy can be issued at the time of the request, such that the potential customer is instantly covered by a policy. At block 415, operations to determine if a final insurance policy will be issued are initiated. As discussed above, those operations could cause a large delay in time. With a bridging insurance policy in place, the potential customer has a guarantee and the piece of mind that they are covered.

Figure 5:
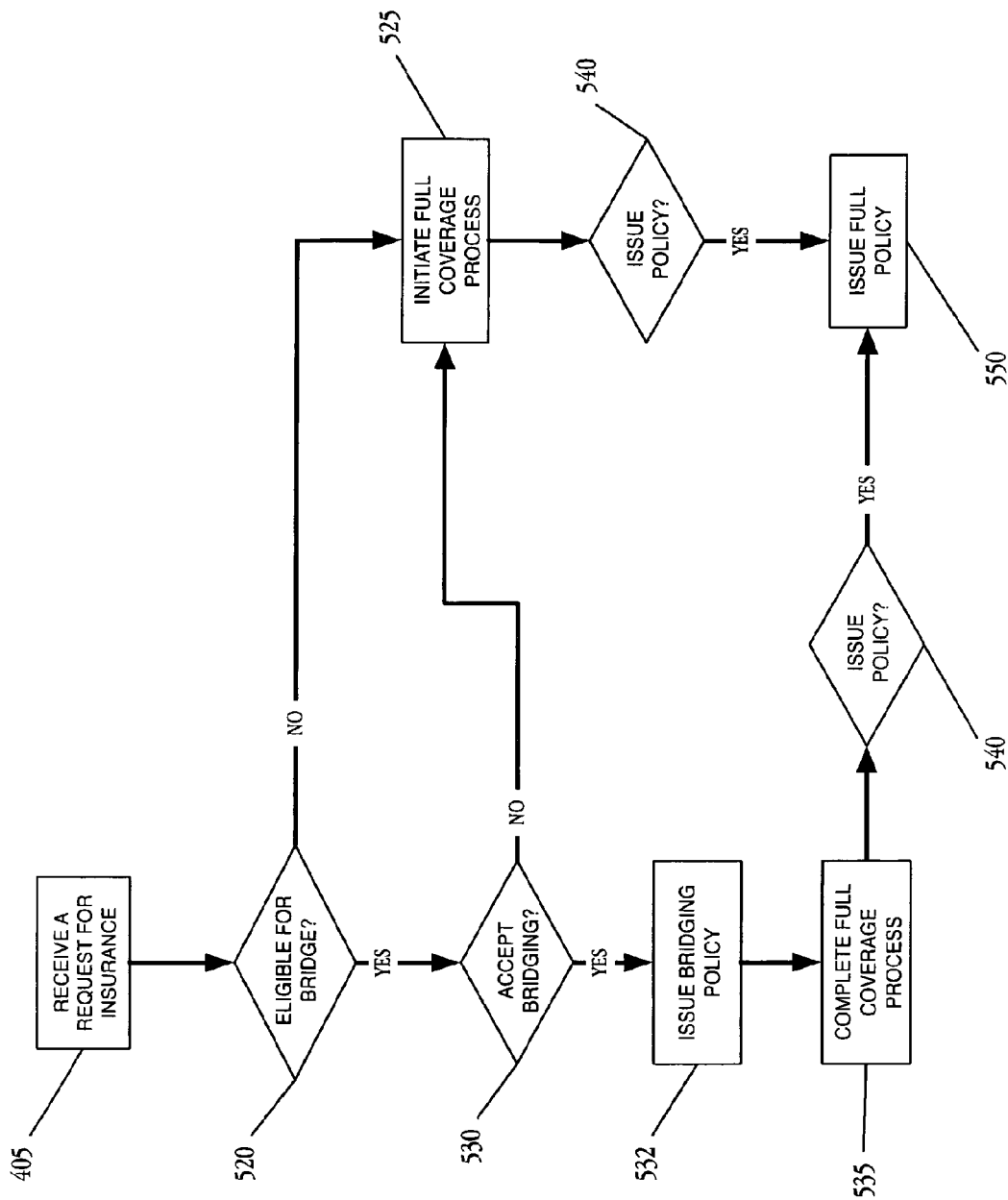
FIG. 5 shows a flow diagram of a more detailed method of processing a customer for insurance coverage, in accordance with an example embodiment.

FIG. 5 shows a flow diagram of a more detailed method of processing a customer for insurance coverage, in accordance with an example embodiment. The method depicted in FIG. 5 may be carried out in the system discussed above with respect to FIG. 1, in one example. The operations described in FIG. 5 begin similarly to those described above with respect to FIG. 4 with a request for an insurance policy received at block 405. In the operations described here with respect to FIG. 5, the end result is that a final insurance policy is issued.

At block 520, a determination is made regarding the requestor's 102 eligibility for a bridging insurance policy. Eligibility may be based on any number of factors including, but not limited to, initial risk rating, requestor's 102 previous relationship with the company, amount of coverage requested, type of coverage requested, other services provided to the requestor 102, and the like. If the requestor 102 is eligible for a bridging insurance policy, it will be offered to them. If the requestor 102 is not eligible for a bridging insurance policy, the operations required to issue a final insurance policy will be initiated at block 525.

At block 530, the requestor 102 either accepts or declines the bridging insurance policy. If the requestor 102 declines, the operations at block 525 will be initiated. If the requestor 102 accepts, a bridging insurance policy will be issued for a coverage amount at block 532. In one example, the coverage amount is equal to the coverage amount requested initially at block 405. In another example, the coverage amount for a bridging insurance policy has a maximum amount, such as $500,000. In such a situation, if the coverage amount requested at block 405 exceeds $500,000, the bridging insurance policy will only be written for $500,000. Alternatively, a coverage amount requested at block 405 in excess of some pre-set amount will cause the requestor 102 to be ineligible for a bridging insurance policy at block 520.

If the requestor 102 accepts the bridging insurance policy at block 530, the process to issue a final insurance policy is initiated at block 535. The processes initiated at block 535 are similar to those at block 525 and may include one or more external processes 108 as discussed above. For example, a medical examination may be required prior to the issuance of the final insurance policy at block 540. Additionally, the issuance of the bridging insurance policy at block 532 may require further operations to ensure that the bridging insurance policy is temporary in nature. Based on the information obtained in the one or more external processes 108 and the initial request, a determination to issue or not issue a final insurance policy is made at block 540. Regardless of whether a final insurance policy is issued at block 540, the bridging insurance policy will be terminated. This ensures that the risk to the company issuing the bridging insurance policy is minimized. If a final insurance policy is to be issued, it is issued at block 550.

Figure 6:
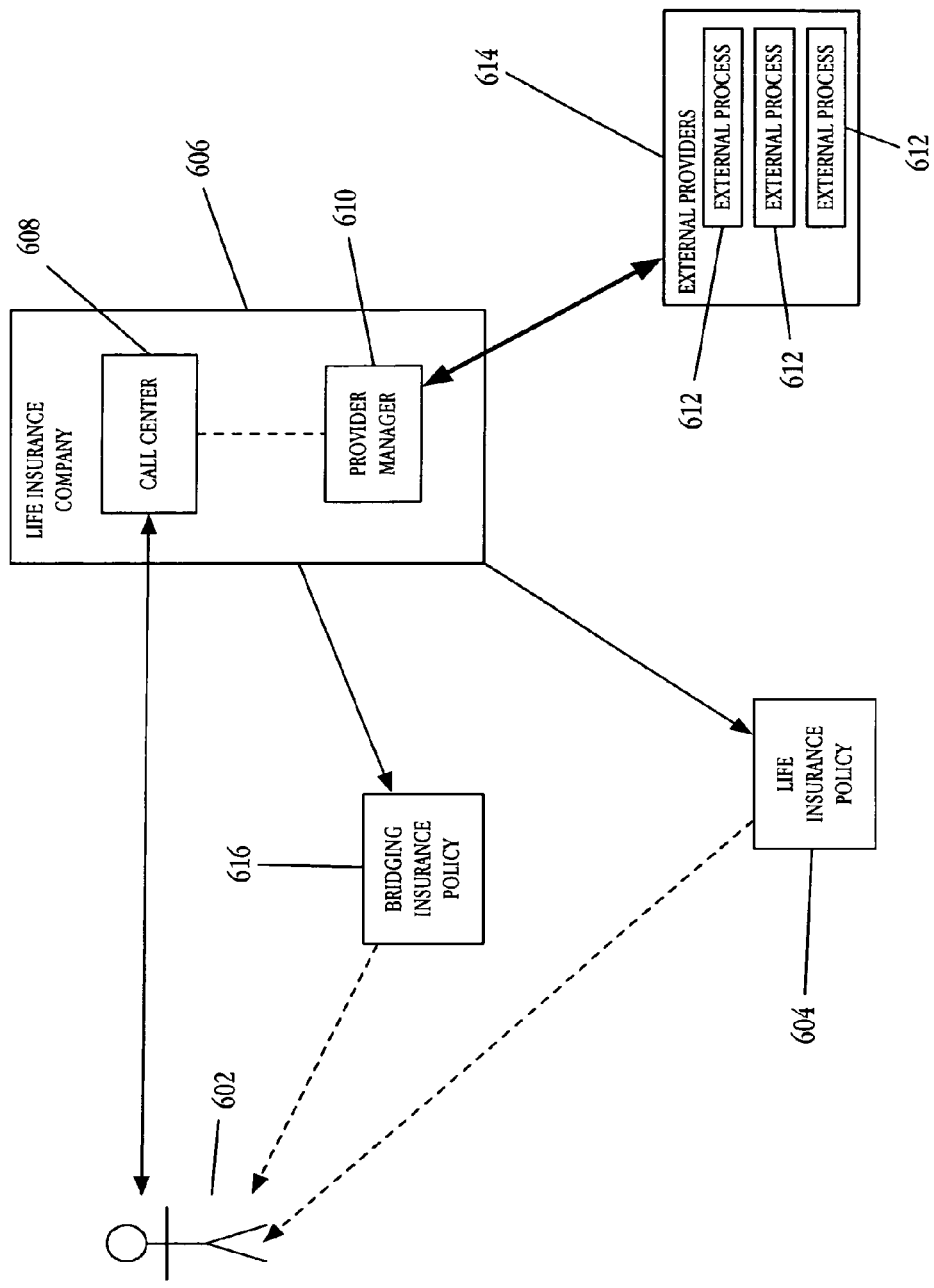
FIG. 6 shows a flow diagram of a method of processing a customer for financial services in a system, in accordance with an example embodiment.

FIG. 6 shows a flow diagram of a method of processing a customer for financial services in a system, in accordance with an example embodiment. In an embodiment, a member 602 is requesting a life insurance policy 604 from the insurance company 606. As discussed above, a life insurance policy 604 is just one of many financial services that could be offered to a customer through the systems and methods discussed here and use of a life insurance policy 604 as an example is not meant to be limiting in any manner. The scenario discussed here will be with respect to an interaction with an agent, or service representative, at the life insurance company 604, though this is only meant as an example, and the systems and methods described here have equal applicability to a system where the requestor interacts solely or in part with an automated system, such as a computer server operated by the life insurance company 606. In this example, the requestor is already a member of the life insurance company 606, which is a member-owned insurance cooperative.

In an embodiment, the life insurance company 606 operates a call center 608 to service the request of the member 602. The call center 608 is a physical or virtual grouping of agents or service representatives available for dynamic interaction with the member 602, in one example. The call center 608 receives calls from members and is capable of facilitating the issuance of a bridging insurance policy and a final insurance policy, according to the methods and systems previously described. In addition to the call center 608, the life insurance company 604 operates a provider manager 610 that is in communication with the call center 608. The provider manager 610 is capable of receiving requests for information from the call center, the information required for the approval of the financial service. As discussed above, acquiring the information requires the completion of one or more external processes 612. These external processes may be completed by one or more external providers 614. The provider manager 610, in one example, performs the function of managing the request for information and the receipt of information related to that request. The provider manager 610 may be a software application executed on any suitable computer device, in one embodiment. In an alternate embodiment, the provider manager 610 may be a physical or virtual grouping of service representatives that manage the external processes through any suitable means.

The member 602 calls into the call center 608 operated by the life insurance company 606 and is connected with a service representative. The representative greets the member 602 and inquires as to how they can help the member 602 today. In this scenario, the member 602 indicates their desire to obtain life insurance coverage. The representative obtains information from the member 602 concerning their situation and some personal details. Based on this information, the representative may suggest an amount of coverage that would be fiscally responsible based on the needs of that particular member 602 and then inquire if the member 602 wishes to proceed further. The representative would then ask questions based on a Risk Profile analysis, the Risk Profile analysis used to determine the risk class of the member 602. The risk class may be unobtainable in some cases where the member 602 has a high-risk occupation, or has a medical condition. In such cases, a specific determination needs to be made as to the risk associated with insuring that member 602. In such a situation, the member 602 may also be ineligible for a bridging life insurance policy. The risk class is also used to initially determine the premium for the amount of coverage requested. This premium may change after more information is obtained. Additionally, the service representative at the call center 608 may query the medical information bureau (MIB) for other information related to the member, or to verify the information received during the call. The MIB is a privately operated service used by companies in the insurance industry.

Using the premium quote, the representative informs the member 602 that they are eligible for coverage and again inquires if the member 602 wishes to proceed further. By using the information already obtained, the representative determines if the member 602 is eligible for a bridging insurance policy 616. In one example, the representative must answer yes to the following questions in order to qualify the member 602 for a bridging insurance policy 616: are they eligible for other insurance offered by the insurance company 606, is the coverage amount requested below a certain amount, such as $500,000, and are they in a state where a bridging insurance policy 616 is allowable by law. Additionally, the insurance company 606 may choose to allow members requesting insurance coverage in excess of that certain amount, but only offer a bridging insurance policy 616 up to that certain amount. For example, the member 602 requests $1,000,000 in coverage and they are eligible in all other ways for the bridging insurance policy 616. The representative can qualify them for the bridging insurance policy 616, but only up to a certain amount, such as $500,000.

If the member 602 is eligible, the representative can communicate that to the member 602 and tell them that they are eligible to be covered immediately under this program. The representative informs them of the terms of the bridging insurance policy 616 and the requirements for the program. In this example, the member 602 is required to pay two months of premiums. Additionally, the member 602 agrees to perform their required processes within a certain period of time. For example, they agree to complete and fill out all the application forms within 15 days. They are informed that failure to do so will result in the termination of the bridging insurance policy 616. Other conditions may be placed on the member 602 as are suitable and these are only illustrative. After being informed of the program and informed of their obligations, the representative asks the member 602 if they wish to take advantage of the program. The representative can process the 2 month premium payment over the phone through any means, such as electronic check or credit card. Additionally, if the member 602 has a banking relationship with a bank closely associated with the life insurance company 604, a wire transfer from the member's 602 bank account could also be used.

The insurance company 606 notes in their systems that the member 602 is part of a instant coverage program so that internal processes of the insurance company 606 can be expedited. Additionally, this may mean that forms provided to the member 602 for completion are also provided with pre-addressed and postage paid envelopes. In one example, a pre-paid Federal Express envelope is provided to the member 602.

Providing instant coverage to a member 602 is a risk to the insurance company 606. The insurance company 606 may require some security device to reduce its risk during the period of the bridging insurance policy 616. However, using the member's previous relationship with the insurance company 606 as an indicator of the risk during the period of the bridging insurance policy, the insurance company may require nothing more then the commitment of the member to complete the steps required to issue a final life insurance policy 604. In other words, the insurance company 606 may require no security device from the member 602.

The bridging insurance policy 616 should be terminated if the member 602 fails to perform what is required of them, or if at any point in the process it is found that the member 602 is in a risk class that is not eligible for instant coverage. Such a situation might occur if during the medical examination it is found that there is a pre-existing medical condition that significantly changes the risk class for the member 602, such as diabetes or heart disease. However, termination of instant coverage would only occur after the member 602 is contacted and informed of the situation. In the case of failure to provide the paperwork required to complete the application process, this may mean that the representative can decide to continue the instant coverage if the member 602 agrees to complete the paperwork and send it in a timely manner.

Figure 7:
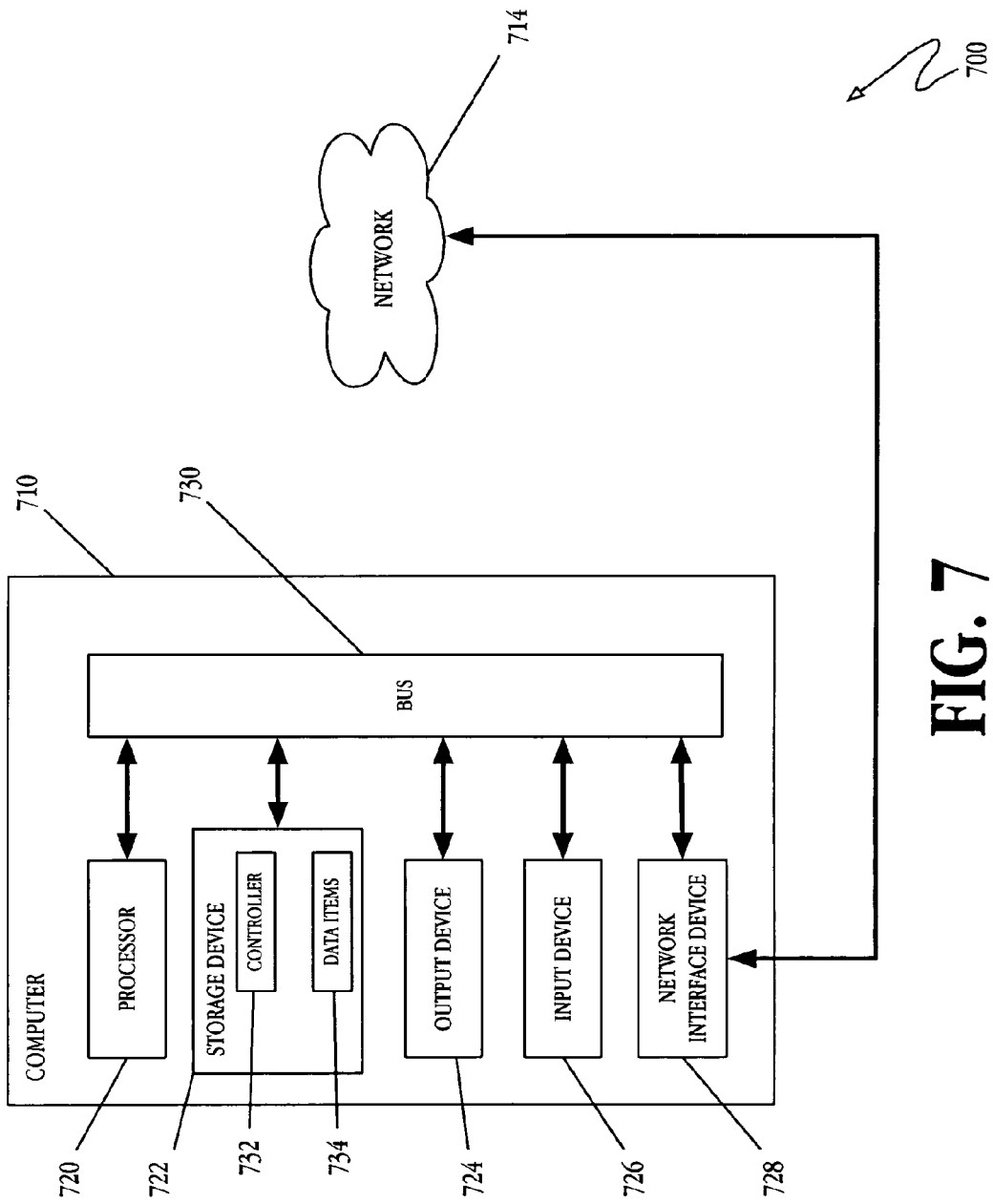
FIG. 7 is a block diagram of a machine including instructions to perform any one or more of the methodologies described herein.

FIG. 7 shows a block diagram of a machine including instructions to perform any one or more of the methodologies described herein. A system 700 includes a computer 710 connected to a network 714. The computer 710 includes a processor 720, a storage device 722, an output device 724, an input device 726, and a network interface device 728, all connected via a bus 730. The processor 720 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 720 executes instructions and includes that portion of the computer 710 that controls the operation of the entire computer. Although not depicted in FIG. 7, the processor 720 typically includes a control unit that organizes data and program storage in memory and transfers data and other information between the various parts of the computer 710. The processor 720 receives input data from the input device 726 and the network 714, reads and stores code and data in the storage device 722, and presents data to the output device 724.

Although the computer 710 is shown to contain only a single processor 720 and a single bus 730, the disclosed embodiment applies equally to computers that may have multiple processors, and to computers that may have multiple busses with some or all performing different functions in different ways.

The storage device 722 represents one or more mechanisms for storing data. For example, the storage device 722 may include read only memory (ROM), random access memory (RAM), magnetic disk storage media, optical storage media, flash memory devices, and/or other machine-readable media. In other embodiments, any appropriate type of storage device may be used. Although only one storage device 722 is shown, multiple storage devices and multiple types of storage devices may be present. Further, although the computer 710 is drawn to contain the storage device 722, it may be distributed across other computers, for example on a server.

The storage device 722 includes a controller 732 and data items 734. The controller includes instructions capable of being executed on the processor 720 to carry out the functions, as previously described above with reference to FIGS. 1-6. In another embodiment, some or all of the functions are carried out via hardware in lieu of a processor-based system. In one embodiment, the controller is a web browser, but in other embodiments, the controller may be a database system, a file system, an electronic mail system, a media manager, an image manager, or may include any other functions capable of accessing data items. Of course, the storage device 722 may also contain additional software and data (not shown), which is not necessary to understanding the invention.

Although the controller 732 and the data items 734 are shown to be within the storage device 722 in the computer 710, some or all of them may be distributed across other systems, for example on a server and accessed via the network 714.

The output device 724 is that part of the computer 710 that displays output to the user. The output device 724 may be a liquid crystal display (LCD) well-known in the art of computer hardware. But, in other embodiments the output device 724 may be replaced with a gas or plasma-based flat-panel display or a traditional cathode-ray tube (CRT) display. In still other embodiments, any appropriate display device may be used. Although only one output device 724 is shown, in other embodiments any number of output devices of different types, or of the same type, may be present. In an embodiment, the output device 724 displays a user interface.

The input device 726 may be a keyboard, mouse or other pointing device, trackball, touchpad, touch screen, keypad, microphone, voice recognition device, or any other appropriate mechanism for the user to input data to the computer 710 and manipulate the user interface previously discussed. Although only one input device 726 is shown, in another embodiment any number and type of input devices may be present.

The network interface device 728 provides connectivity from the computer 710 to the network 714 through any suitable communications protocol. The network interface device 728 sends and receives data items from the network 714.

The bus 730 may represent one or more busses, e.g., USB (Universal Serial Bus), PCI, ISA (Industry Standard Architecture), X-Bus, EISA (Extended Industry Standard Architecture), or any other appropriate bus and/or bridge (also called a bus controller).

The computer 710 may be implemented using any suitable hardware and/or software, such as a personal computer or other electronic computing device. Portable computers, laptop or notebook computers, PDAs (Personal Digital Assistants), pocket computers, appliances, telephones, and mainframe computers are examples of other possible configurations of the computer 710. For example, other peripheral devices such as audio adapters or chip programming devices, such as EPROM (Erasable Programmable Read-Only Memory) programming devices may be used in addition to, or in place of, the hardware already depicted.

The network 714 may be any suitable network and may support any appropriate protocol suitable for communication to the computer 710. In an embodiment, the network 714 may support wireless communications. In another embodiment, the network 714 may support hard-wired communications, such as a telephone line or cable. In another embodiment, the network 714 may support the Ethernet IEEE (Institute of Electrical and Electronics Engineers) 802.3x specification. In another embodiment, the network 714 may be the Internet and may support IP (Internet Protocol). In another embodiment, the network 714 may be a local area network (LAN) or a wide area network (WAN). In another embodiment, the network 714 may be a hotspot service provider network. In another embodiment, the network 714 may be an intranet. In another embodiment, the network 714 may be a GPRS (General Packet Radio Service) network. In another embodiment, the network 714 may be any appropriate cellular data network or cell-based radio network technology. In another embodiment, the network 714 may be an IEEE 802.11 wireless network. In still another embodiment, the network 714 may be any suitable network or combination of networks. Although one network 714 is shown, in other embodiments any number of networks (of the same or different types) may be present.

The embodiments described herein may be implemented in an operating environment comprising software installed on any programmable device, in hardware, or in a combination of software and hardware.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of providing a bridge life insurance policy, the method comprising:
providing a processor;
receiving, from a customer, a request to purchase a life insurance policy from a first organization, the life insurance policy having a coverage amount, wherein approval of the request requires completion of an external process;
determining, using the processor, that a second organization, that is associated with the first organization, has had a previous relationship with the customer independent of the request to purchase the life insurance policy;
determining, using the processor, based at least on financial information obtained during the previous relationship between the second organization and the customer, that the customer meets eligibility requirements for a bridge life insurance policy;
defining a coverage amount for the bridge life insurance policy less than or equal to the coverage amount of the life insurance policy;
issuing the bridge life insurance policy to the customer;
initiating the external process required for the approval of the life insurance policy;
issuing the life insurance policy upon completion of the external process; and
terminating the bridge life insurance policy based upon issuance of the life insurance policy.

2. The method of claim 1 wherein the bridge life insurance policy has a term of less than 90 days.

3. The method of claim 2 wherein the value of the bridge life insurance policy does not exceed $500,000.

4. The method of claim 1 wherein the coverage amount for the bridge life insurance policy is less than the coverage amount of the life insurance policy.

5. The method of claim 1 wherein issuing the bridge life insurance policy to the customer includes receiving an indication from the customer of their acceptance of an additional bridge financial service.

6. The method of claim 1 wherein receiving the request for the life insurance policy comprises receiving the request at a call center.

7. The method of claim 1 wherein the external process includes at least one of a medical examination or a blood and urine analysis.

8. A non-transitory computer-readable storage medium comprising a plurality of computer-readable instructions tangibly embodied on the computer-readable storage medium, which, when executed by a data processor, provide a bridge life insurance policy, the plurality of instructions comprising:
instructions that cause the data processor to receive, from a customer, a request to purchase a life insurance policy from a first organization, the life insurance policy having a coverage amount, wherein approval of the request requires completion of an external process;
instructions that cause the data processor to determine that the a second organization, that is associated with the first organization, has had a previous relationship with the customer independent of the request to purchase the life insurance policy;
instructions that cause the data processor to determine, based at least on financial information obtained during the previous relationship between the second organization and the customer, that the customer meets eligibility requirements for a bridge life insurance policy;
instructions that cause the data processor to define a coverage amount for the bridge life insurance policy less than or equal to the coverage amount of the life insurance policy;
instructions that cause the data processor to issue the bridge life insurance policy to the customer;
instructions that cause the data processor to initiate the external process required for the approval of the life insurance policy;
instructions that cause the data processor to issue the life insurance policy upon completion of the external process; and
instructions that cause the data processor to terminate the bridge life insurance policy based upon issuance of the life insurance policy.

9. The non-transitory computer-readable storage medium of claim 8 wherein the bridge life insurance policy has a term of less than 90 days.

10. The non-transitory computer-readable storage medium of claim 9 wherein the value of the bridge life insurance policy does not exceed $500,000.

11. The non-transitory computer-readable storage medium of claim 8 wherein the coverage amount for the bridge life insurance policy is less than the coverage amount of the life insurance policy.

12. The non-transitory computer-readable storage medium of claim 8 wherein issuing the bridge life insurance policy to the customer includes receiving an indication from the customer of their acceptance of an additional bridge financial service.

13. The non-transitory computer-readable storage medium of claim 8 wherein the request is received at a call center.

14. The non-transitory computer-readable storage medium of claim 8 wherein the external process includes at least one of a medical examination or a blood and urine analysis.

15. A method of providing a bridge life insurance policy, the method comprising:
providing a processor;
receiving, from an existing customer of a first organization, a request to purchase a life insurance policy from the first organization, the life insurance policy having a coverage amount;
determining, using the processor, that approval of the request requires completion of an external process including at least one of a medical examination or a blood and urine analysis;
receiving, from the existing customer, a second request for a bridge life insurance policy having a second coverage amount less than or equal to the coverage amount;
determining, based on financial information obtained about the existing customer through a previous relationship between the existing customer and the first organization, an indicator of risk for issuing the bridge life insurance policy to the existing customer, wherein the financial information was obtained independent of the request to purchase the life insurance policy;
issuing the bridge life insurance policy to the existing customer;
initiating the external process required for the approval of the life insurance policy;
issuing the life insurance policy upon completion of the external process; and
terminating the bridge life insurance policy based upon issuance of the life insurance policy.

16. The method of claim 15 wherein the bridge life insurance policy has a term of less than 90 days.

17. The method of claim 16 wherein the value of the bridge life insurance policy does not exceed $500,000.

18. The method of claim 15 wherein the coverage amount for the bridge life insurance policy is less than the coverage amount of the life insurance policy.

19. The method of claim 15 wherein issuing the bridge life insurance policy to the existing customer includes receiving an indication from the existing customer of their acceptance of an additional bridge financial service.

20. The method of claim 15 wherein receiving the request for the life insurance policy comprises receiving the request at a call center.

* * * * *